(12) United States Patent
Srinivasan et al.

(10) Patent No.: US 9,497,291 B2
(45) Date of Patent: Nov. 15, 2016

(54) AUTOMATIC UPDATE DISTRIBUTION FOR MANAGED DEVICES

(71) Applicant: Google Inc., Mountain View, CA (US)

(72) Inventors: Jayendran Srinivasan, Milpitas, CA (US); Glenn Wilson, Los Angeles, CA (US); Sumit Gwalani, Mountain View, CA (US); Mark Alan Larson, San Carlos, CA (US)

(73) Assignee: GOOGLE INC., Mountain View, CA (US)

( * ) Notice: Subject to any disclaimer, the term of this patent is extended or adjusted under 35 U.S.C. 154(b) by 408 days.

(21) Appl. No.: 13/771,011

(22) Filed: Feb. 19, 2013

(65) Prior Publication Data

US 2015/0207902 A1    Jul. 23, 2015

(51) Int. Cl.
    *G06F 15/16* (2006.01)
    *H04L 29/08* (2006.01)

(52) U.S. Cl.
    CPC .............. *H04L 67/34* (2013.01); *H04L 67/325* (2013.01)

(58) Field of Classification Search
    CPC ......... G06Q 10/107; G06F 8/68; G06F 8/70; G06F 8/71; G06F 8/65; G06F 11/0793; G06F 11/1433; G06F 3/1225; G06F 8/60; G06F 8/06; G06F 8/62; G06F 8/63; G06F 8/64; G06F 8/66; G06F 8/665; G06F 8/67; H04L 12/585; H04L 12/58; H04W 76/068
    See application file for complete search history.

(56) References Cited

U.S. PATENT DOCUMENTS

| | | | | |
|---|---|---|---|---|
| 6,009,274 A | * | 12/1999 | Fletcher | G06F 8/65 709/217 |
| 6,117,188 A | * | 9/2000 | Aronberg | G06F 8/61 717/176 |
| 7,379,705 B1 | * | 5/2008 | Rados | H04M 1/72547 455/2.01 |
| 2005/0120040 A1 | * | 6/2005 | Williams | H04L 67/325 |
| 2006/0143460 A1 | * | 6/2006 | Chaki | G11B 20/00086 713/176 |
| 2007/0088633 A1 | * | 4/2007 | Phillips | G06Q 10/087 705/28 |
| 2014/0189669 A1 | * | 7/2014 | Asselin | G06F 11/1433 717/168 |

OTHER PUBLICATIONS

"CSMA/CARP," Wikipedia, last modified Dec. 24, 2012, retrieved from <http://en.wikipedia.org/wiki/CSMA/CARP>.
T. Reeder, "4 Strategies for Punching Down Traffic Spikes," High Scalability, Jul. 12, 2012, Possibility Outpost, retrieved from <http://highscalability.com/blog/2012/7/12/4-strategies-for-punching-down-traffic-spikes.html>.
"Bandwidth Throttling," Wikipedia, last modified Feb. 11, 2013, retrieved from <http://en.wikipedia.org/wiki/Bandwidth_throttling>.

* cited by examiner

*Primary Examiner* — Suraj Joshi
*Assistant Examiner* — Jaren M. Means
(74) *Attorney, Agent, or Firm* — McDermott Will & Emery LLP

(57) ABSTRACT

Methods for scheduling data download requests for a device are provided. In one aspect, a method includes assigning to a device a first wait period of a random length below a first pre-determined maximum value, and receiving a notification that data is available for download to the device. The method also includes determining whether an amount of time elapsed since the data was made available for download to the device exceeds the first wait period, and when the determination indicates that the amount of time elapsed since the data was made available for download exceeds the first wait period, downloading the data available for the device. Systems and machine-readable media are also provided.

19 Claims, 4 Drawing Sheets

AUTOMATIC UPDATE DISTRIBUTION FOR MANAGED DEVICES

BACKGROUND

Field

The present disclosure generally relates to the transmission of data over a network, and more particularly to the use of a computing device to communicate over a network.

Description of the Related Art

Organizations such as businesses and schools often have a limited network bandwidth (e.g., for the Internet). Many such organizations centrally manage data delivery, such as software updates, for software common to each client device (e.g., laptops, desktops) of the organization. When new data becomes available for that software, each of the client devices may attempt to download the new data at the same time over the organization's network, which results in a substantial increase in the organization's bandwidth consumption. The increase often severely reduces the organization's available network bandwidth or brings the organization's network down altogether.

SUMMARY

According to one embodiment of the present disclosure, a computer-implemented method for scheduling data download requests for a device is provided. The method includes assigning to a device a first wait period of a random length below a first pre-determined maximum value, and receiving a notification that data is available for download to the device. The method also includes determining whether an amount of time elapsed since the data was made available for download to the device exceeds the first wait period, and when the determination indicates that the amount of time elapsed since the data was made available for download exceeds the first wait period, downloading the data available for the device.

According to another embodiment of the present disclosure, a system for scheduling data download requests for a device is provided. The system includes a memory that includes instructions, and a processor. The processor is configured to execute the instructions to assign to a device a first wait period of a random length below a first pre-determined maximum value, and receive a notification that data is available for download to the device. The processor is also configured to execute the instructions to determine whether an amount of time elapsed since the data was made available for download to the device exceeds the first wait period. When the determination indicates that the amount of time elapsed since the data was made available for download exceeds the first wait period, the processor is configured to execute the instructions to download the data available for the device. When the determination indicates that the amount of time elapsed since the data was made available for download is less than the first wait period, the processor is configured to execute the instructions to wait for the amount of time elapsed since the data was made available for download to exceed the first wait period.

According to a further embodiment of the present disclosure, a machine-readable storage medium includes machine-readable instructions for causing a processor to execute a method for scheduling data download requests for a device is provided. The method includes assigning to a device a first wait period of a random length below a first pre-determined maximum value, and receiving a notification that data is available for download to the device. The method also includes determining whether an amount of time elapsed since the data was made available for download to the device exceeds the first wait period. When the determination indicates that the amount of time elapsed since the data was made available for download exceeds the first wait period, the device is assigned a second wait period of a random length below a second pre-determined maximum value. When the determination indicates that the amount of time elapsed since the data was made available for download is less than the first wait period, the method includes waiting for the amount of time elapsed since the data was made available for download to exceed the first wait period. When an amount of time the device has been running since the first wait period elapsed exceeds the second wait period, the data available for the device is downloaded.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
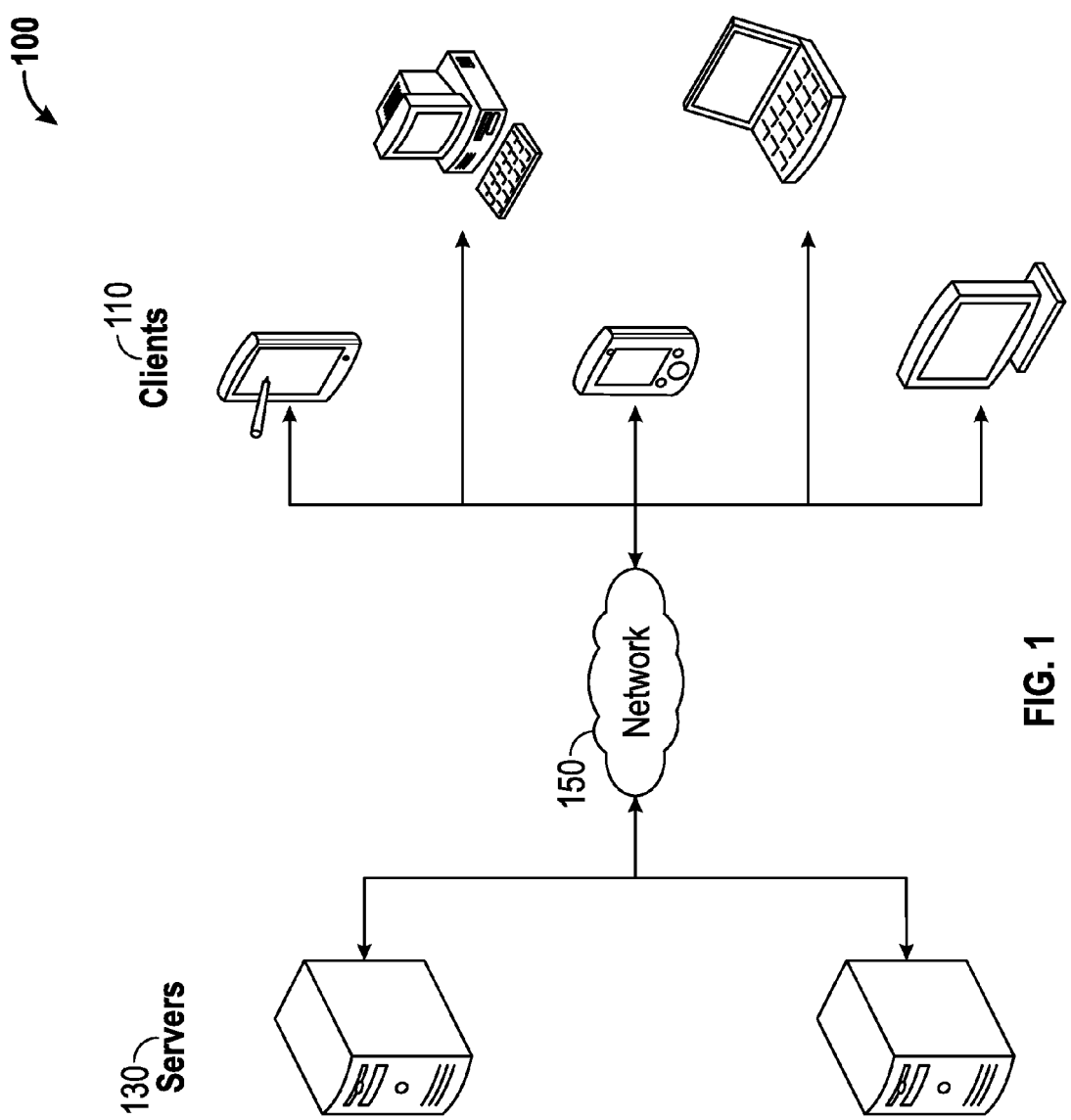
FIG. 1 illustrates an example architecture for scheduling data download requests for a device.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system schedules each client on a network to download data at different times by having each client assigned one or two periods of random length that must expire in order for the client device to accept and download data (e.g., a software update) over the network. Specifically, a first "wall-clock" wait is assigned to a client. The wall-clock wait can be assigned by the client itself. The wall-clock wait is a random value that is between 0 seconds and a maximum value set by an administrator. The client checks a system clock to determine whether the wall-clock wait has elapsed since the data became available (e.g., from a server hosting the data) for the client before accepting and downloading the data. The client may nonetheless continue to regularly check the server for data updates, except that the client will not accept any data update from the server until the client's wall-clock wait has elapsed.

A second "uptime" wait can be assigned to the client after the wall-clock wait has elapsed in order to further delay the data download (e.g., in the case where multiple clients are powered on at the same time after their respective wall-clock waiting periods have elapsed). After the wall-clock wait has elapsed, the client is assigned (e.g., a self-assignment) a random uptime wait period that is between 0 seconds and a pre-determined maximum value. The client determines the amount of time the client has been powered on (e.g., and running processes) since the wall-clock wait elapsed. If the amount of time the client has been powered on since the wall-clock wait elapsed exceeds the uptime wait period, the client accepts and downloads the data. Otherwise, if the amount of time the client has been powered on since the wall-clock wait elapsed is less than the uptime wait period, the client does not accept and download the data.

Alternatively, the client can be assigned (e.g., a self-assignment) a random uptime wait value that is between zero data availability determinations and a pre-determined maximum value. The client determines how many times the client has determined whether data is available for download (e.g., how many times the client has asked a server if an update is available) since the wall-clock wait elapsed. If the number of time of times the client has determined whether data is available for download exceeds the random uptime wait value, the client accepts and downloads the data. Otherwise, if the number of time of times the client has determined whether data is available for download is below the random uptime wait value, the client does not accept and download the data. In either type of uptime wait, the client may nonetheless continue to regularly check for data updates, except that the client will not accept any data update until the client's uptime wait has been fulfilled.

In certain aspects, exceptions can be made for urgent data downloads (e.g., urgent software updates). During a regularly scheduled data update, a client can determine whether an available data update has been designated as urgent. If the available data update is designated as urgent, the client disregards both the wall-clock wait and the uptime wait and proceeds to immediately download the data update over the network. Otherwise, if the available data update is not designated as urgent, the client observes both the wall-clock wait and the uptime wait prior to downloading the data update.

FIG. 1 illustrates an example architecture 100 for scheduling data download requests for a device. The architecture 100 includes servers 130 and clients 110 connected over a network 150.

One of the many servers 130 is configured to host data for download by a client 110. The data may be used, for example, to add new functionality to a client 110 or to update the functionality of the client 110. The data can be, for example, a software installation file or a software update file. For purposes of load balancing, multiple servers 130 can host the data, either in full or in part.

The servers 130 can be any device having an appropriate processor, memory, and communications capability for hosting the data for download. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each client 110 is configured to download the data from a server 130 over the network 150. The disclosed system, which may be a download interface running on each client 110 or on the server 130, is configured to assign each client 110 a random value for a first waiting period. The first waiting period must elapse before the client 110 downloads the data from the server 130. The random value is between 0 seconds and a predetermined maximum value. After the first waiting period has elapsed, the client may either download the data or be required to wait a second waiting period before downloading the data from the server. The download interface is configured to assign each client 110 a random value between zero and a predetermined maximum value for the second waiting period. The random value can be, for example, a time value or a number count for how many times the client 110 checks whether there is data for download on the server 130. Unlike the first waiting period, which may transpire whether or not the client 110 is powered on, the second waiting period transpires while the client 110 is powered on. After the second waiting period has elapsed, the client may download the data from the server 130.

Figure 2:
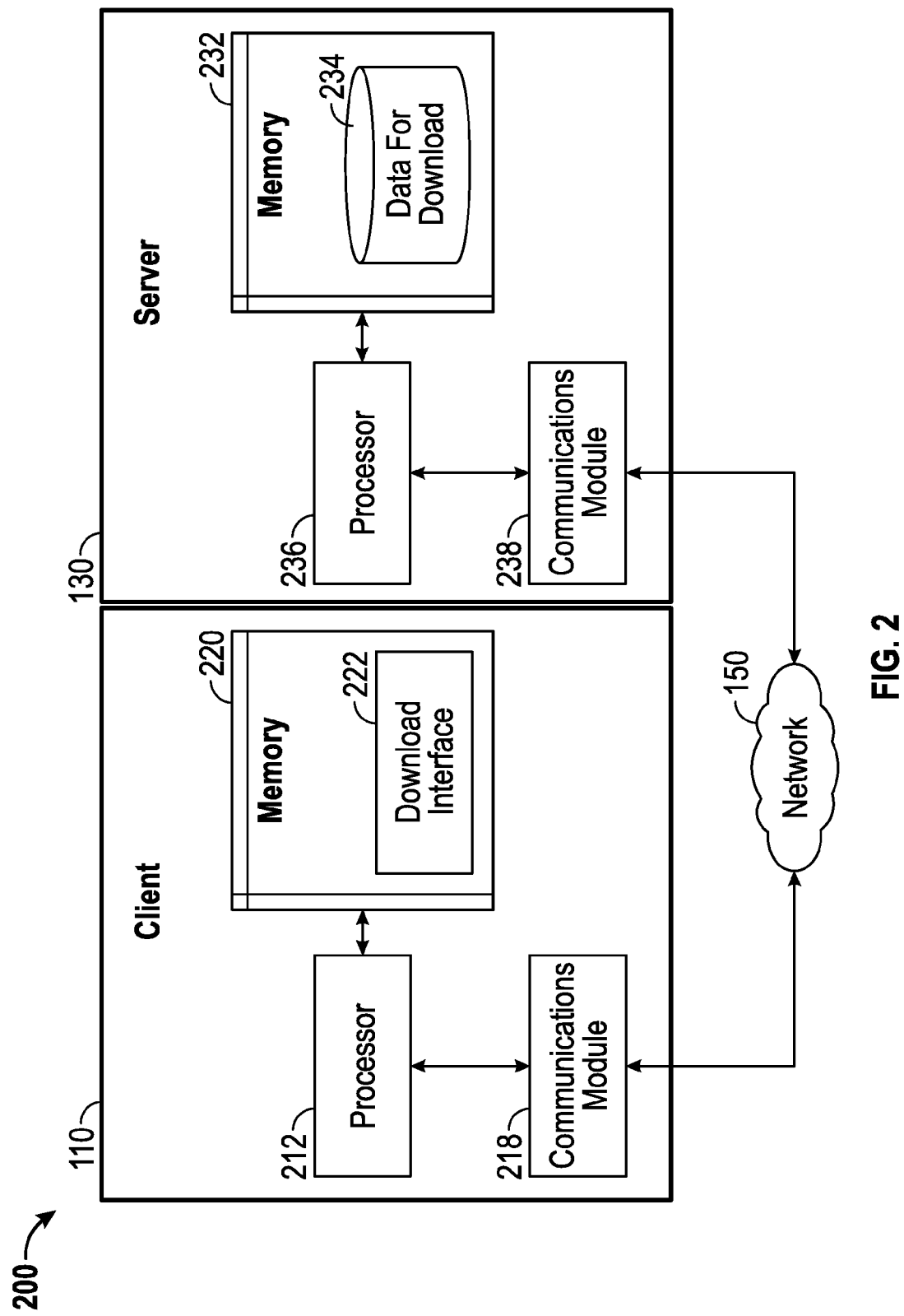
FIG. 2 is a block diagram illustrating the example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes data for download 234. The client 110 includes a processor 212, the communications module 218, and a memory 220 that includes a download interface 222 configured to download the data 234 from the server 130. When the client 110 downloads the data 234 from the server 130, the processor 236 of the server 130 responds to a request from the processor 212 of the client 110 to download the data 234, and the data 234 is sent to the client 110 using respective communications modules 218 and 238 of the client 110 and server 130.

Although the download interface 222 is illustrated as being stored in the memory 220 of the client 110, the download interface 222 can also be stored and executed in the memory 232 of the server 130. In this case, commands from the download interface 222 to the client 110 would be sent over the network 150.

The processor 212 of the client 110 is configured to execute instructions, such as instructions physically coded into the processor 212, instructions received from software in memory 240, or a combination of both. For example, the processor 212 of the client 110 executes instructions to schedule data download requests for the client 110. Specifically, the processor 212 of the client 110 is configured to execute instructions from the download interface 222 to assign to the client 110 a first wait period of a random length below a first pre-determined maximum value. Thus, in certain aspects, although data 234 may be available for download to the client 110, the client 110 will nonetheless forego downloading the data 234 until at least one wait period has expired, as discussed in further detail below.

The pre-determined maximum value for the first wait period can be assigned by an administrator of the server 130 or client 110, and the random length for the first wait period can be generated and assigned to the client 110 by the client (i.e., a self-assignment). For example, an administrator can set the first pre-determined maximum value to be 240 minutes, and the first wait period can be for the randomly generated (by the client 110) time of 90 minutes.

The processor 212 of the client 110 is further configured to receive a notification that data 234 is available for download to the client 110. The notification can be received, for example, from the server 130. The notification can be sent from the server 130 to the client 110 in response to a scheduled data check with the server 130 by the client 110 to determine whether the server 130 has data for download 234.

The processor 212 of the client 110 is also configured to determine whether an amount of time elapsed since the data 234 was made available for download to the client 110 exceeds the first wait period, and when the determination indicates that the amount of time elapsed since the data 234 was made available for download exceeds the first wait period, the processor 212 is configured to download the data 234. When the determination indicates that the amount of time elapsed since the data 234 was made available for download is less than the first wait period, the processor 212 is configured to wait for the amount of time elapsed since the data 234 was made available for download to exceed the first wait period.

In certain aspects, when the determination indicates that the amount of time elapsed since the data 234 was made available for download exceeds the first wait period, the processor 212 is configured to assign to the client 110 a second wait period. Using a second wait period is advantageous for situations where, for example, a plurality of clients 110 being managed by an institution are powered off while the first wait period elapses (e.g., for the entirety of the first pre-determined maximum value of the first wait period), and are then turned on after the first wait period has elapsed (e.g., on the Monday after a weekend). If there were no second wait period, the clients would seek to download the data for download 234 at the same time because each of the clients 110 when turned on determines that their respective first wait periods have elapsed.

The second wait period can be a random length of time below a second pre-determined maximum value, or a random value representing a number of times the client 110 has checked whether the server 130 has data available for download 234. The second pre-determined maximum value can be embedded into the client 110. For example, the memory of the client 110 may indicate a fixed value of 450 minutes as the second pre-determined maximum value for the second wait period. The second wait period can also be assigned to the client 110 by the client 110. For aspects that include the second wait period as a random length of time, the processor 212 is configured 110 to determine an amount of time the client 110 has been running since the first wait period elapsed, and when the determination indicates that the amount of time the client 110 has been running since the first wait period elapsed exceeds the second wait period, download the data 234 available for the device.

For aspects that include the second wait period as a random value, the processor 212 is configured to determine a number of times the client 110 has checked whether the data 234 is available for download since the first wait period elapsed, and when the determination indicates that the number of times the client 110 has checked whether the data 234 is available for download since the first wait period elapsed exceeds the second wait period, the processor 212 is configured to download the data 234 available for the client 110. For example, if the first wait period is three days (i.e., 72 hours) and the second wait period is ten occurrences of the client 110 checking the server 130, then after 72 hours has passed, and then subsequently after the client 110 has checked the server 130 for data 234 ten times, the client 110 downloads the data 234 from the server 130.

In certain aspects, data for download 234 can be designated as urgent (e.g., high priority). Specifically, a bit, data tag, or other indicator associated with the data for download 234 on the server 130 may indicate the data for download 234 is urgent. In such circumstances, either the first wait period, the second wait period, or both may be disregarded, and the processor 212 is configured to immediately download the data 234 to the client 110 when the data 234 is identified as available by the client 110.

Figure 3:
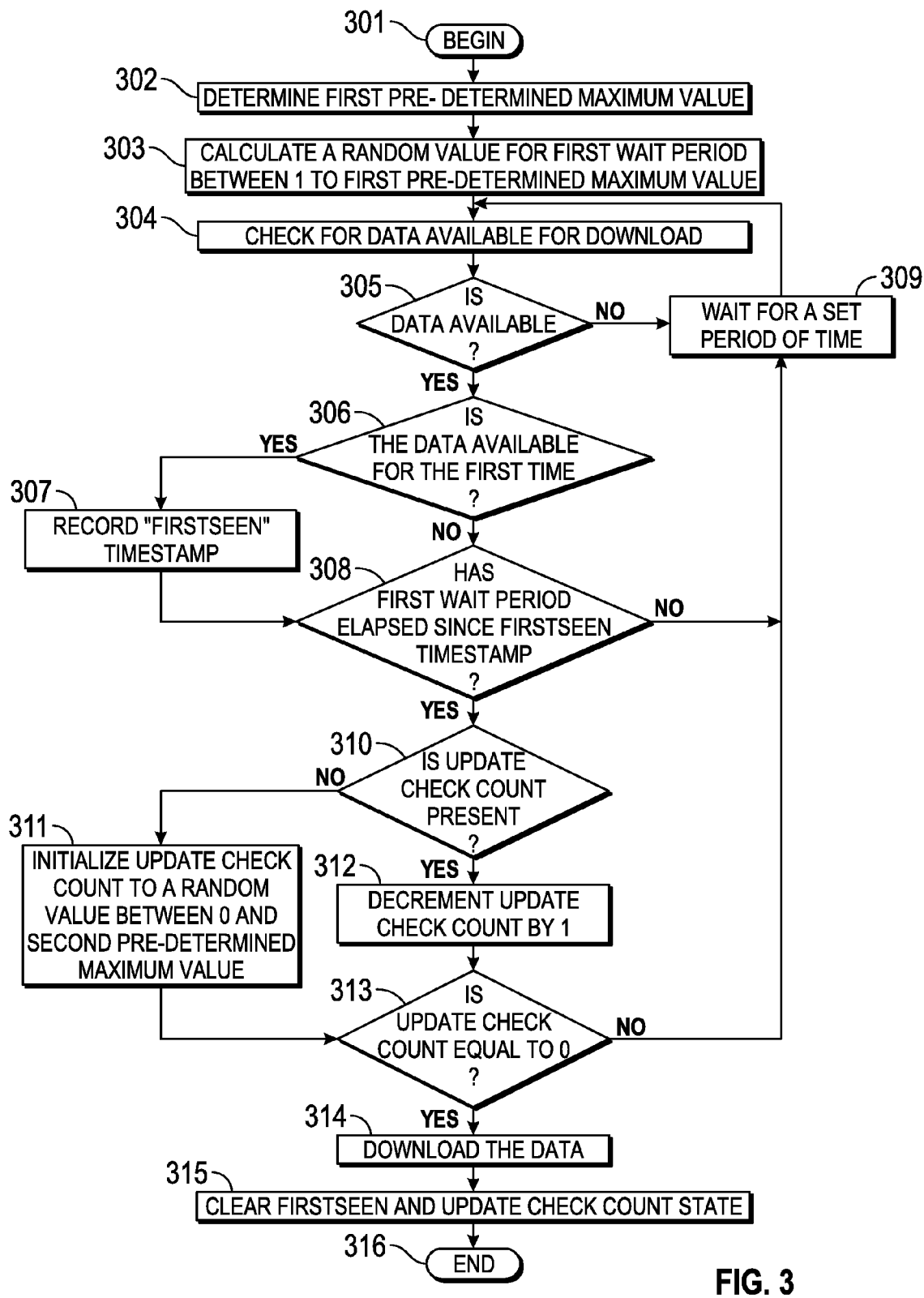
FIG. 3 illustrates an example process for scheduling data download requests for a device using the example client of FIG. 2.

FIG. 3 illustrates an example process 300 for scheduling data download requests for a device using the example client 110 of FIG. 2 and two waiting periods. The second waiting period is based on a number of checks by the client 110 for available data for download 234 on the server 130. While FIG. 3 is described with reference to FIG. 2, it should be noted that the process steps of FIG. 3 may be performed by other systems.

The process 300 begins by proceeding from beginning step 301 when a client 110 is powered on and running, to step 302 the processor 212 of the client 110 determines a first pre-determined maximum value for a first wait period. The first pre-determined maximum value can, for example, be assigned to the client 110 by an administrator of the server 130. Next, in step 303, a random value between one to the first pre-determined maximum value is calculated, and in step 304 the client 110 checks for available data for download 234 on the server 130. If it is determined in decision step 306 that data for download 234 is available, the process 300 proceeds to decision step 306, otherwise the process 300 jumps to step 309 in which the client 110 waits for a set period of time, and then the process 300 returns to step 304 from step 309.

In decision step 306, if the data for download 234 is identified as being available for the first time, the client 110 records a "firstseen" timestamp in memory 220 in step 307, and the process 300 proceeds to decision step 308. If the data for download 234 is not identified as being available for the first time in decision step 306, the process 300 immediately proceeds to decision step 308. In decision step 308, the client 110 determines whether the first wait period has elapsed since the firstseen timestamp was recorded (i.e., since the data for download 234 was first identified as available by the client 110). If the first wait period is determined as having elapsed since the firstseen timestamp was recorded, the process 300 proceeds to decision step 310, otherwise the process 300 proceeds to step 309 discussed above.

In decision step 310, the client 110 determines whether an update check count for the data for download 234 is being maintained or otherwise present in the memory 220 of the client 110. The update check count indicates how many times the client 110 has checked whether the data for download 234 is available on the server 130. If the client 110 determines an update check count for the data for download 234 is not present, the process 300 proceeds to step 311 in which an update check count is initialized for the client 110 to a random value between zero and a second pre-determined maximum value, and then the process 300 proceeds to decision step 313. Otherwise, if the client 110 determines an update check count for the data for download 234 is present in decision step 310, the process 300 proceeds to step 312 in which the update check count is decreased by one, and then the process 300 proceeds to decision step 313.

In decision step 313, the client 110 checks to determine whether the update check count value is equal to zero. If the update check count is not equal to zero, the process 300 returns to step 309 discussed above, otherwise if the update check count is equal to zero the process 300 proceeds to step 314 in which the data for download 234 is downloaded by the client 110 and step 315 in which the firstseen and update check count states are cleared. The process 300 then ends in step 316.

FIG. 3 set forth an example process 300 for scheduling data download requests for a device using the example client 110 of FIG. 2. An example will now be described using the example process 300 of FIG. 3 and data for download 234 that is a software update for the client 110, which is a desktop computer managed by an institution.

The process 300 begins by proceeding from beginning step 301 when user turns on the desktop computer 110 at the institution, to step 302 when the download interface 222 on the desktop computer 110, in initializing a software update process, determines the first pre-determined maximum value for a first wait period is 48 hours. The first pre-determined maximum value is assigned to the desktop computer 110 by an administrator of the server 130 hosting the software update 234.

Next, in step 303, a random value of six hours is calculated and set for the first wait period for the desktop computer 110, and in step 304 the client 110 checks whether a software update 234 is available on the server 130. It is determined in decision step 306 that a software update 234 is available, and the process 300 proceeds to decision step 306. In decision step 306, the software update 234 is identified as being available for the first time, and the desktop computer 110 records a firstseen timestamp in memory 220 in step 307, and the process 300 proceeds to decision step 308. In decision step 308, the desktop computer 110 determines that the first wait period has not elapsed since the firstseen timestamp was recorded (i.e., since the software update 234 was first identified in decision step 306 as available). The process 300 proceeds to step 309, in which the desktop computer waits for one hour. The process 300 then returns to and repeats steps 304 to 308 until in decision step 308 the first wait period of six hours is determined to have elapsed since the firstseen timestamp.

The process 300 then proceeds to decision step 310 in which the desktop computer 110 determines that an update check count for the data for download 234 is not currently being maintained on the desktop computer 110. The process 300 proceeds to step 311 in which an update check count is initialized for the desktop computer 110 by the desktop computer 110 to a random value of six, which is between zero and a second pre-determined maximum value of eight assigned by the desktop computer 110, and then the process 300 proceeds to decision step 313. In decision step 313, the client 110 determines that the update check count value is equal to six, not zero, and the process 300 returns to step 309 where the desktop computer 110 waits for an hour before proceeding. After the hour has elapsed, the process 300 continues to step 304.

Returning to step 304, the client 110 checks whether a software update 234 is available on the server 130. It is determined in decision step 306 that a software update 234 is available, and the process 300 proceeds to decision step 306. In decision step 306, the software update 234 is identified as not being available for the first time, and the process 300 proceeds to decision step 308. In decision step 308, the desktop computer 110 determines that the first wait period has elapsed since the firstseen timestamp was recorded, and the process 300 proceeds to decision step 310 in which the desktop computer 110 determines that an update check count for the data for download 234 is currently being maintained on the desktop computer 110 and currently has a value of six. The process 300 proceeds to step 312 in which the update check count is decreased to a value of five, and then the process 300 proceeds to decision step 313. In decision step 313, the client 110 determines that the update check count value is equal to five, not zero, and the process 300 returns to step 309 where the desktop computer 110 waits for an hour before proceeding. After the hour has elapsed, the process 300 continues to steps 304-312, which are repeated until the update check count value is determined to be equal to zero in decision step 313.

The process 300 then proceeds to step 314 in which the software update 234 is downloaded by the desktop computer 110, and step 315 in which the firstseen and update check count states are cleared. The process 300 then ends in step 316.

Figure 4:
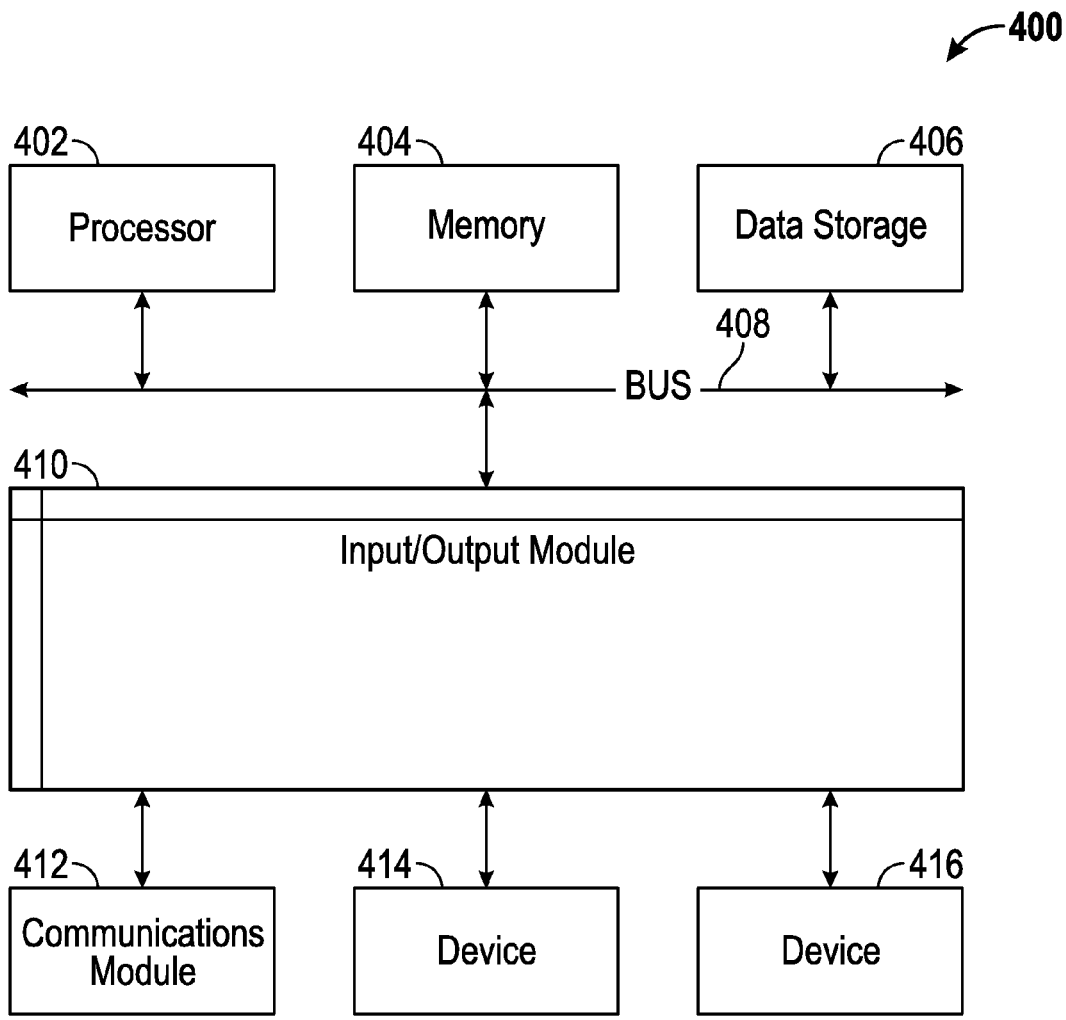
FIG. 4 is a block diagram illustrating an example computer system with which the client and server of FIG. 2 can be implemented.

FIG. 4 is a block diagram illustrating an example computer system 400 with which the client 110 and server 130 of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., client 110 and servers 130) includes a bus 408 or other communication mechanism for communicating information, and a processor 402 (e.g., processor 212 and 236) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 218 and 238) include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for scheduling data download requests for a device, the method comprising:
    assigning to a device a first wait period of a random length below a first pre-determined maximum value and a second wait period of a random length below a second pre-determined maximum value prior to receiving a notification that data is available for download to the device;
    receiving a notification that data is available for download to the device;
    determining whether an amount of time elapsed since the data was made available for download to the device exceeds the first wait period;
    determining an amount of time the device has been running since the first wait period elapsed; and
    downloading for installation the data available for the device after the determination indicates that the amount of time elapsed since the data was made available for download exceeds the first wait period and the amount of time the device has been running since the first wait period elapsed exceeds the second wait period.

2. The computer implemented method of claim 1, further comprising:
    when the determination indicates that the amount of time elapsed since the data was made available for download is less than the first wait period, waiting for the amount of time elapsed since the data was made available for download to exceed the first wait period.

3. A computer-implemented method of claim 1, further for scheduling data download requests for a device, the method comprising:
    assigning to a device a first wait period of a random length below a first pre-determined maximum value and a second wait period of a random value below a second pre-determined maximum value;
    receiving a notification that data is available for download to the device;
    determining whether an amount of time elapsed since the data was made available for download to the device exceeds the first wait period;
    determining a number of times the device has checked whether the data is available for download since the first wait period elapsed; and
    downloading for installation the data available for the device after the determination indicates that the amount of time elapsed since the data was made available for download exceeds the first wait period and wherein the data available for the device is downloaded when the determination indicates that the number of times the device has checked whether the data is available for download since the first wait period elapsed exceeds the second pre-determined maximum value wait period.

4. The computer implemented method of claim 3, wherein the second pre-determined maximum value is embedded into the device.

5. The computer implemented method of claim 1, wherein the first wait period is assigned to the device by the device.

6. The computer implemented method of claim 1, wherein the second wait period is assigned to the device by the device.

7. The computer implemented method of claim 1, wherein the notification is received from a server hosting the data.

8. The computer implemented method of claim 7, wherein the notification is received in response to a scheduled data check with the server by the device.

9. The computer implemented method of claim 1,
wherein the notification comprises a value indicating that the data available for download to the device has been designated as urgent,
wherein the determining whether the amount of time elapsed since the data was made available for download to the device exceeds the first wait period comprises determining whether the data has been designated as urgent, and the method further comprising:
wherein the data available for the device is downloaded when the determination indicates that the data has been designated as urgent regardless of whether the amount of time elapsed since the data was made available for download to the device exceeds the first wait period or the amount of time the device has been running since the first wait period elapsed exceeds the second wait period.

10. The computer implemented method of claim 1, wherein the first pre-determined maximum value is assigned by an administrator.

11. A system for scheduling data download requests for a device, the system comprising:
a memory comprising instructions;
a processor configured to execute the instructions to:
assign to a device a first wait period of a random length below a first pre-determined maximum value and a second wait period of a random length below a second pre-determined maximum value prior to receiving a notification that data is available for download to the device;
receive a notification that data is available for download to the device;
determine whether an amount of time elapsed since the data was made available for download to the device exceeds the first wait period;
determine an amount of time the device has been running since the first wait period elapsed;
download for installation the data available for the device after the determination indicates that the amount of time elapsed since the data was made available for download exceeds the first wait period and the amount of time the device has been running since the first wait period elapsed exceeds the second wait period; and
when the determination indicates that the amount of time elapsed since the data was made available for download is less than the first wait period, waiting for the amount of time elapsed since the data was made available for download to exceed the first wait period.

12. A system for scheduling data download requests for a device, the system comprising of claim 11, wherein the processor is further configured to execute the instructions to:
a memory comprising instructions;
a processor configured to execute the instructions to:
assign to a device a first wait period of a random length below a first pre-determined maximum value and second wait period of a random value below a second pre-determined maximum value;
receive a notification that data is available for download to the device;
determine whether an amount of time elapsed since the data was made available for download to the device exceeds the first wait period;
determine a number of times the device has checked whether the data is available for download since the first wait period elapsed; and
download for installation the data available for the device after the determination indicates that the amount of time elapsed since the data was made available for download exceeds the first wait period and wherein the data available for the device is downloaded when the determination indicates that the number of times the device has checked whether the data is available for download since the first wait period elapsed exceeds the second pre-determined maximum value wait period.

13. The system of claim 12, wherein the second pre-determined maximum value is embedded into the device.

14. The system of claim 11, wherein at least one of the first wait period or the second wait period is assigned to the device by the device.

15. The system of claim 11, wherein the notification is received from a server hosting the data in response to a scheduled data check with the server by the device.

16. The system of claim 11,
wherein the notification comprises a value indicating that the data available for download to the device has been designated as urgent,
wherein the determining whether the amount of time elapsed since the data was made available for download to the device exceeds the first wait period comprises determining whether the data has been designated as urgent, and
wherein the data available for the device is downloaded when the determination indicates that the data has been designated as urgent regardless of whether the amount of time elapsed since the data was made available for download to the device exceeds the first wait period or the amount of time the device has been running since the first wait period elapsed exceeds the second wait period.

17. The system of claim 11, wherein the first pre-determined maximum value is assigned by an administrator.

18. A non-transitory machine-readable storage medium comprising machine-readable instructions for causing a processor to execute a method for scheduling data download requests for a device, the method comprising:
assigning to a device a first wait period of a random length below a first pre-determined maximum value and a second wait period of a random length below a second pre-determined maximum value prior to receiving a notification that data is available for download to the device;
receiving a notification that data is available for download to the device;

determining whether an amount of time elapsed since the data was made available for download to the device exceeds the first wait period;

determining an amount of time the device has been running since the first wait period elapsed;

when the determination indicates that the amount of time elapsed since the data was made available for download exceeds the first wait period, assigning to the device a second wait period of a random length below a second pre-determined maximum value;

when the determination indicates that the amount of time elapsed since the data was made available for download is less than the first wait period, waiting for the amount of time elapsed since the data was made available for download to exceed the first wait period;

when the amount of time elapsed since the data was made available for download exceeds the first wait period and the amount of time the device has been running since the first wait period elapsed exceeds the second wait period, downloading the data available for the device.

19. A non-transitory machine-readable storage medium comprising machine-readable instructions for causing a processor to execute a method for scheduling data download requests for a device, the method comprising:

assigning to a device a first wait period of a random length below a first pre-determined maximum value and a second wait period of a random value below a second pre-determined maximum value;

receiving a notification that data is available for download to the device;

determining whether an amount of time elapsed since the data was made available for download to the device exceeds the first wait period;

determining a number of times the device has checked whether the data is available for download since the first wait period elapsed; and downloading for installation the data available for the device after the determination indicates that the amount of time elapsed since the data was made available for download exceeds the first wait period and the determination indicates that the number of times the device has checked whether the data is available for download since the first wait period elapsed exceeds the second pre-determined maximum value.

* * * * *